United States Patent
Oakes, III et al.

(10) Patent No.: US 11,669,845 B1
(45) Date of Patent: *Jun. 6, 2023

(54) SYSTEMS AND METHODS FOR COMPETITIVE ONLINE QUOTES WEB SERVICE

(71) Applicant: United Services Automobile Association (USAA), San Antonio, TX (US)

(72) Inventors: Charles Lee Oakes, III, Boerne, TX (US); Rickey Dale Burks, Boerne, TX (US); Reynaldo Medina, III, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 203 days.

This patent is subject to a terminal disclaimer.

(21) Appl. No.: 16/818,610

(22) Filed: Mar. 13, 2020

Related U.S. Application Data

(63) Continuation of application No. 11/858,510, filed on Sep. 20, 2007, now Pat. No. 10,650,388, which is a
(Continued)

(51) Int. Cl.
*G06Q 30/02* (2023.01)
*G06Q 30/06* (2023.01)
(Continued)

(52) U.S. Cl.
CPC ............. *G06Q 30/02* (2013.01); *G06Q 30/06* (2013.01); *G06Q 30/0201* (2013.01); *G06Q 40/06* (2013.01); *G06Q 40/08* (2013.01)

(58) Field of Classification Search
CPC .... G06Q 30/02; G06Q 30/06; G06Q 30/0201; G06Q 40/08; G06Q 40/06
See application file for complete search history.

(56) References Cited

U.S. PATENT DOCUMENTS 6,226,654 B1 * 5/2001 Van Hoff ............... G06F 9/451
709/219
6,233,566 B1 * 5/2001 Levine .................. G06Q 40/02
705/36 R
(Continued)

FOREIGN PATENT DOCUMENTS

EP 0973112 A2 1/2000
EP 1262885 A2 * 12/2002 ....... G06F 17/30516
(Continued)

OTHER PUBLICATIONS

FRISK Software International: How to delete unnecessary software using Disk Cleanup, Internet Archives, Mar. 13, 2006, pp. 1-3 (Year: 2006).*
(Continued)

*Primary Examiner* — Bijendra K Shrestha
(74) *Attorney, Agent, or Firm* — BakerHostetler

(57) ABSTRACT

Systems and methods aggregate financial product pricing information. In response to a request, systems and methods receive first company financial product pricing information, pre-fill data associated with the request to a web page of the second company, and scrape the web page of the second company to extract the financial product pricing information of the second company using the data aggregation tool after the web page of the second company returns the financial product pricing information. This information is presented to the user.

20 Claims, 11 Drawing Sheets

Related U.S. Application Data continuation-in-part of application No. 11/757,966, filed on Jun. 4, 2007, now abandoned, and a continuation-in-part of application No. 11/757,964, filed on Jun. 4, 2007, now abandoned, and a continuation-in-part of application No. 11/757,970, filed on Jun. 4, 2007, now abandoned.

(60) Provisional application No. 60/869,908, filed on Dec. 14, 2006.

(51) Int. Cl.
*G06Q 30/0201* (2023.01)
*G06Q 40/06* (2012.01)
*G06Q 40/08* (2012.01)

(56) References Cited

U.S. PATENT DOCUMENTS

| | | | | |
|---|---|---|---|---|
| 6,826,553 | B1* | 11/2004 | DaCosta | G06F 16/9535 |
| | | | | 715/255 |
| 6,873,968 | B2 | 3/2005 | Ehrlich et al. | |
| 7,343,309 | B2* | 3/2008 | Ogawa | G06Q 40/08 |
| | | | | 705/2 |
| 7,610,218 | B2 | 10/2009 | Bodmer et al. | |
| 7,660,738 | B1* | 2/2010 | Siegel | G06Q 30/02 |
| | | | | 705/26.1 |
| 8,706,565 | B2* | 4/2014 | Rollins | G06Q 20/20 |
| | | | | 705/26.7 |
| 2001/0049632 | A1* | 12/2001 | Rigole | G06Q 30/0601 |
| | | | | 705/7.31 |
| 2002/0143712 | A1 | 10/2002 | Suzuki | |
| 2002/0161609 | A1 | 10/2002 | Zizzamia et al. | |
| 2003/0078817 | A1 | 4/2003 | Harrison et al. | |
| 2004/0044613 | A1 | 3/2004 | Murakami et al. | |
| 2004/0128171 | A1 | 7/2004 | Rees et al. | |
| 2004/0143464 | A1 | 7/2004 | Houle et al. | |
| 2004/0143600 | A1* | 7/2004 | Musgrove | G06F 16/24575 |
| 2005/0004819 | A1 | 1/2005 | Etzioni et al. | |
| 2005/0055299 | A1* | 3/2005 | Chambers | G06Q 40/04 |
| | | | | 705/36 R |
| 2005/0203781 | A1 | 9/2005 | Wilson et al. | |
| 2006/0015467 | A1* | 1/2006 | Morken | G06Q 30/06 |
| | | | | 705/400 |
| 2006/0095377 | A1* | 5/2006 | Young | H04L 63/10 |
| | | | | 705/50 |
| 2007/0129972 | A1 | 6/2007 | Labelle et al. | |
| 2007/0136191 | A1* | 6/2007 | Itwaru | G06Q 30/04 |
| | | | | 705/40 |
| 2008/0098300 | A1* | 4/2008 | Corrales | G06F 16/986 |
| | | | | 707/E17.118 |
| 2008/0109378 | A1 | 5/2008 | Papadimitriou | |

FOREIGN PATENT DOCUMENTS

| | | | | |
|---|---|---|---|---|
| WO | | 03096224 A1 | 11/2003 | |
| WO | WO-03096224 A1 * | | 11/2003 | G06F 16/957 |
| WO | WO-2004088476 A2 * | | 10/2004 | G06Q 10/02 |

OTHER PUBLICATIONS

FRISK Software International: How to delete unnecessary software using Disk Cleanup, Internet Archives, Mar. 13, 2006, pp. 1-3 3 (Year: 2006).*
PRNewswire: Insurance.com Launches Comparison Auto Insurance Quotes in New Jersey, Jun. 13, 2005, pp. 1-3. (Year: 2005).*
PRNewswire: Point, Click and You're Covered: Michigan Motorists Can Purchase Progressive Auto Insurance on the Internet, Sep. 15, 1998, pp. 1-2 (Year: 1998).*
AutoVantage: AutoVantage Introduces Auto Insurance Comparison Feature From Progressive—Online Car Buyers Can Save Hundreds on Insurance, May 28, 1998, PRNewswire, pp. 1-3 (Year: 1998).*
Barber et al.: Managing the Risks of Data Aggregation, 2000, Bank Accounting & Finance, pp. 1-6 (Year: 2000).*
Fujii et al.: E-Aggregation: The Present and Future of Online Finacial Services on Asia-Pacific, Sep. 2002, Composite Information Systems Laboratory, MIT, pp. 1-15 (Year: 2002).*
"10 Steps to Buying Auto Insurance, "Edmunds, http ://www.edmunds.com/apps/vdpcontainers/do/vdp/article=89618/pageNumber=5, downloaded Sep. 20, 2007, 2 pages.
"Auto Insurance Quotes", [online], Insurance.com, 2007 [retrieved on Jun. 4, 2007], Retrieved from the Internet: <URL http://www.insurance.com>, 3 pgs.
"AutoVantage Introduces Auto Insurance Rate Comparison Feature from Progressive", PR Newswire, (May 28, 1998), p. 1, 2 pqs.
"Car Insurance—Quote and Compare Our Rates," Progressive, http://www.progressive.com, downloaded Sep. 20, 2007, 5 pages.
Chevalier et al.: Measuring prices and price competition online: Amazon and Barnes and Noble, Apr. 2003, pp. 1-31. (Year: 2003).
"Drivers Can Save Thousands by Comparing Auto Insurance Online at FinanCenter.com," PR Newswire (Jun. 15, 2000), p. 1.
"For a Competitive Car Insurance Quote Online," Rural and General Insurance, http://www.ruralandgeneral.com/au/motor-vehicle-insurance.shtml, downloaded Sep. 20, 2007, 3 pgs.
"Google Product Search", [online], Wikipedia Foundation, Inc., 2007 [retrieved on Jun. 4, 2007], Retrieved from the Internet: <URL: http://en.wikipedia.orq/wiki/Gooqle Product Search>, 2 p.
"How to Get Competitive Quotes on Boat Insurance," Insurance Salesman, http://www.insurancesalesman.com/competitive-quotes-on-boat-insurance.htm, downloaded Sep. 20, 2007, 2 pages.
"InsWeb General Answers", http://web.archive.org/web/20051026022101/http://www.insweb.com/learningcenter/ga/insweb-a.htm, (Oct. 26, 2005), 3 pgs.
"Insurance.com Launches Comparison Auto Insurance Quotes in New Jersey," PR Newswire (Jun. 13, 2005), p. 1.
Krijnen et al.: Automated Web Scraping APIs, Nov. 20, 2000, pp. 1-5. (Year: 2000).
Newprosoft.com: Web Scraping Software: Web Content Extractor, 2004, pp. 1-5 (Year: 2004).
"Point, Click, and You're Covered: Michigan Motorists Can Purchase Progressive Auto Insurance on the Internet", PR Newswire, (Sep. 15, 1998), p. 1, 2 pqs.
"Price Comparison Service", [online], Wikipedia Foundation, Inc., 2007 [retrieved on Jun. 4, 2007], Retrieved from the Internet: <URL: http://en.wikipedia.org/wiki/price comparison service>, 5 p.
PR Newswire: Point, Click and You're Covered: Michigan Motorists Can Purchase Progressive Auto Insurance on the Internet, Sep. 15, 1998, p. 102 (Year: 1998).
Tarter, Steve, "Claiming the Web—Online insurance sales are just a blip the radar screen today, but analysts expect that to begin changing quickly," Journal Star (Jul. 8, 2000), p. C.01.

* cited by examiner

SYSTEMS AND METHODS FOR COMPETITIVE ONLINE QUOTES WEB SERVICE

CROSS-REFERENCE TO RELATED APPLICATIONS

This application is a continuation of and claims priority to U.S. patent application Ser. No. 11/858,510, filed Sep. 20, 2007, which claims priority to Provisional Patent Application No. 60/869,908 filed on Dec. 14, 2006 and entitled, "Systems and Methods for Competitive Online Price Quotes," the entirety of which is hereby incorporated by reference herein. This application is also a continuation-in-part of U.S. patent application Ser. Nos. 11/757,964, 11/757,966, and 11/757,970, each filed on Jun. 4, 2007, each entitled "Systems and Methods For Competitive Online Price Quotes," the entirety of which are hereby incorporated by reference herein.

BACKGROUND

Currently, many firms use a data extraction and integration (aggregator) service to provide competitive product premium pricing information for their main analysts and actuaries.
These services are primarily a "batch" process to gather information, usually once a day, week, or month. Manual processes are then used to read the information, usually stored in a mass of aggregated information and manually analyzed to make decisions that may affect product premium pricing, reports, and processes. In the property and casualty insurance industry there are a variety of institutions that use an aggregation service to compare competitor product premium prices for the purpose of providing customers with premium quotes. The premium pricing information is usually not current (real-time), so these institutions' product premium prices may not be competitive, possibly resulting in a loss of revenue.

Thus, a way to address the shortcomings of the prior art is needed.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In consideration of the above-identified shortcomings of the art, systems and methods for a competitive online quotes web service are provided. In an embodiment, a method comprises receiving, via a data aggregation tool on a customer computer, data associated with a request for financial product pricing information. In response to the request, the method comprises receiving first company financial product pricing information, wherein the first company financial product pricing information is generated by a processor-based system associated with a first company, accessing a web page of a second company, pre-filling data associated with the request to the web page the second company, causing submission of the data associated with the request, and scraping the web page of the second company to extract the financial product pricing information of the second company after the web page of the second company returns the financial product pricing information. The method also comprises providing, via the customer computer, the financial product pricing information from the second company and the first company financial product pricing information. In other embodiments, systems and/or computer-readable media can be utilized to provide first and second company financial product pricing information.

Other features of the subject matter are described below.

BRIEF DESCRIPTION OF THE DRAWINGS

Systems and methods for providing a competitive online quotes web service are further described with reference to the accompanying drawings in which.

DETAILED DESCRIPTION

Certain specific details are set forth in the following description and figures to provide a thorough understanding of various embodiments of the subject matter. Certain well-known details often associated with computing and software technology are not set forth in the following disclosure to avoid unnecessarily obscuring the various embodiments of the subject matter. Further, those of ordinary skill in the relevant art will understand that they can practice other embodiments of the subject matter without one or more of the details described below. Finally, while various methods are described with reference to steps and sequences in the following disclosure, the description as such is for providing a clear implementation of embodiments of the subject matter, and the steps and sequences of steps should not be taken as required to practice this subject matter.

Exemplary Computing Environments

Figure 1:
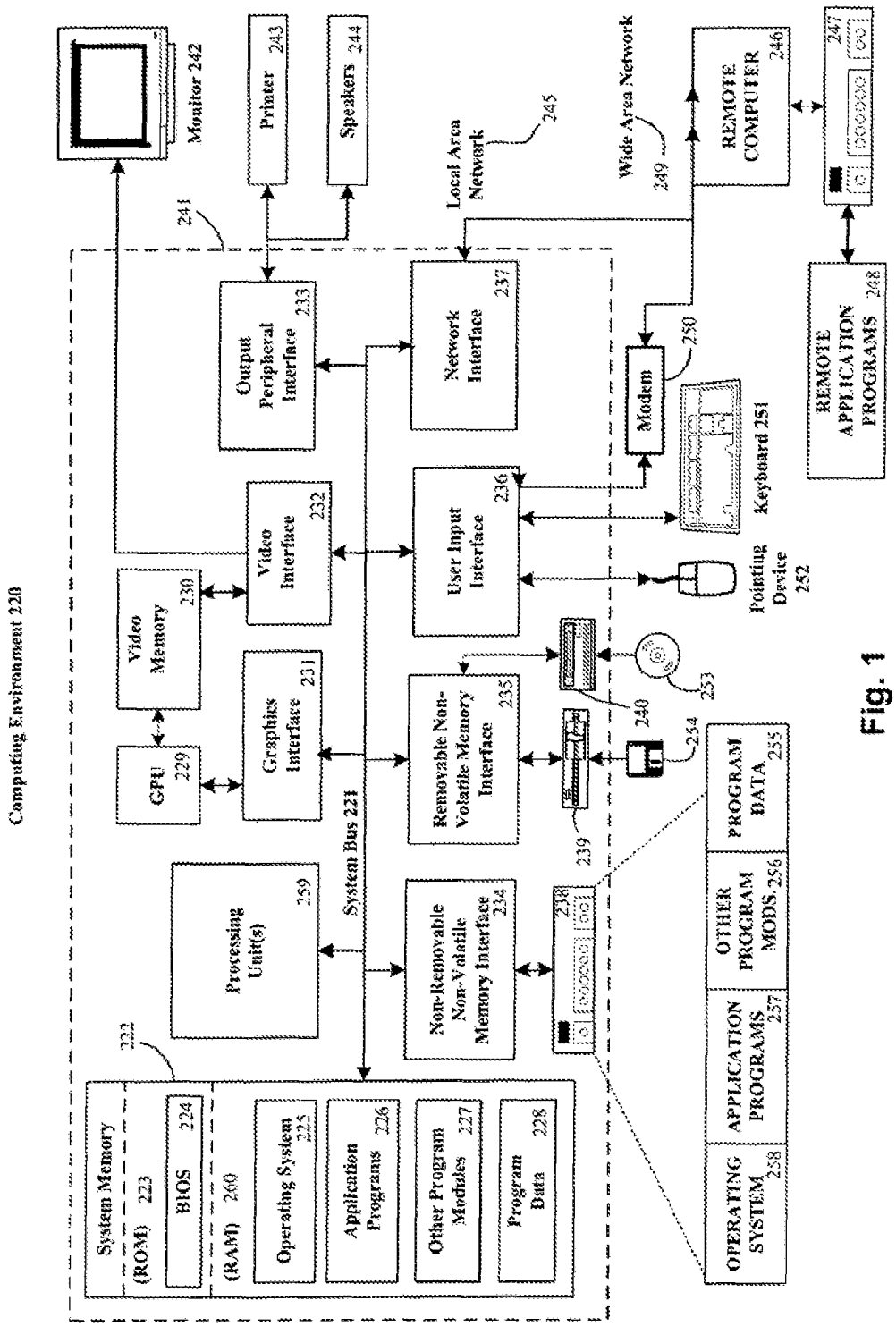
FIG. 1 is a block diagram representing an exemplary computing environment suitable for use in conjunction with providing a competitive online quotes web service.

Referring to FIG. 1, shown is a block diagram representing an exemplary computing environment suitable for use in conjunction with implementing the processes described below. For example, the computer executable instructions that carry out the processes and methods for providing the subject matter of the present disclosure may reside and/or be executed in such a computing environment as shown in FIG. 1. The computing system environment 220 is only one example of a suitable computing environment and is not intended to suggest any limitation as to the scope of use or functionality of the subject matter. Neither should the computing system environment 220 be interpreted as having any dependency or requirement relating to any one or combination of components illustrated in the exemplary computing system environment 220. For example a computer game console may also include items such as those described below for use in conjunction with implementing the processes described above.

Aspects of the subject matter are operational with numerous other general purpose or special purpose computing system environments or configurations. Examples of well known computing systems, environments, and/or configurations that may be suitable for use with the subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the subject matter may be implemented in the general context of computer-executable instructions, such as program modules, being executed by a computer. Generally, program modules include routines, programs, objects, components, data structures, etc. that perform particular tasks or implement particular abstract data types. Aspects of the subject matter may also be practiced in distributed computing environments where tasks are performed by remote processing devices that are linked through a communications network. In a distributed computing environment, program modules may be located in both local and remote computer storage media, including memory storage devices.

An exemplary system for implementing aspects of the subject matter includes a general purpose computing device in the form of a computer 241. Components of computer 241 may include, but are not limited to, a processing unit 259, a graphical processing unit 229 (GPU), a video memory 230, a graphics interface 231, a system memory 222, and a system bus 221 that couples various system components including the system memory 222 to the processing unit 259. The system bus 221 may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 241 typically includes a variety of computer-readable media. Computer-readable media can be any available media that can be accessed by computer 241 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer readable instructions, data structures, program modules or other data. Computer-storage media includes, but is not limited to, random access memory (RAM), read-only memory (ROM), Electrically Erasable Programmable Read-Only Memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 241. Communication media typically embodies computer readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. Combinations of any of the above should also be included within the scope of computer-readable media.

The system memory 222 includes computer-storage media in the form of volatile and/or nonvolatile memory such as ROM 223 and RAM 260. A BIOS (basic input/output system) 224 containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 1 illustrates operating system 225, application programs 226, other program modules 227, and program data 228.

The computer 241 may also include other removable/non-removable, volatile/nonvolatile computer storage media. By way of example only, FIG. 1 illustrates a hard disk drive 238 that reads from or writes to non-removable, non-volatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer-storage media that can be used in the exemplary operating environment include, but are not limited to, magnetic tape cassettes, flash memory cards, DVDs, digital video tape, solid state RAM, solid state ROM, and the like. The hard disk drive 238 is typically connected to the system bus 221 through a non-removable memory interface such as non-removable non-volatile memory interface 234, and magnetic disk drive 239 and optical disk drive 240 are typically connected to the system bus 221 by a removable memory interface, such as removable non-volatile memory interface 235.

The drives and their associated computer-storage media, discussed above and illustrated in FIG. 1, provide storage of computer-readable instructions, data structures, program modules and other data for the computer 241. In FIG. 1, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball, or touch pad. Other input devices (not shown) may include a microphone, joystick, game pad, satellite dish, scanner, or the like. These and other input devices are often connected to the processing unit(s) 259 through a user input interface 236 that is coupled to the system bus 221, but may be connected by other interface and bus structures, such as a parallel port, game port or a universal serial bus (USB). A monitor 242 or other type of display device is also connected to the system bus 221 via an interface, such as a video interface 232. In addition to the monitor 242, computer 241 may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 1. The logical connections depicted in FIG. 1 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface 237. When used in a WAN networking environment, the computer 241 typically includes a modem 250 or other means for establishing communications over the WAN 249, such as the Internet. The modem 250, which may be internal or external, may be connected to the system bus 221 via the user input interface 236 or other appropriate mechanism. In a networked environment, program modules depicted relative to the computer 241, or portions thereof, may be stored in the remote memory storage device. By way of example, and not limitation, FIG. 1 illustrates remote application programs 248 as residing on memory storage device 247. It will be appreciated that the network connections shown are exemplary and that other means of establishing a communications link between the computers may be used.

It should be understood that the various techniques described herein may be implemented in connection with hardware or software or, where appropriate, with a combination of both. Thus, the methods and apparatus of the subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the subject matter, e.g., through the use of an API, reusable controls, or the like. Such programs are preferably implemented in a high-level procedural or object-oriented programming language to communicate with a computer system. However, the program(s) can be implemented in assembly or machine language, if desired. In any case, the language may be a compiled or interpreted language, and may be combined with hardware implementations.

Although exemplary embodiments may refer to utilizing aspects of the subject matter in the context of one or more stand-alone computer systems, the subject matter is not so limited, but rather may be implemented in connection with any computing environment, such as a network or distributed computing environment. Still further, aspects of the subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 1, the systems and methods provided herein cannot be construed as limited in any way to a particular computing architecture. Instead, the subject matter should not be limited to any single embodiment, but rather should be construed in breadth and scope in accordance with the appended claims.

Figure 2:
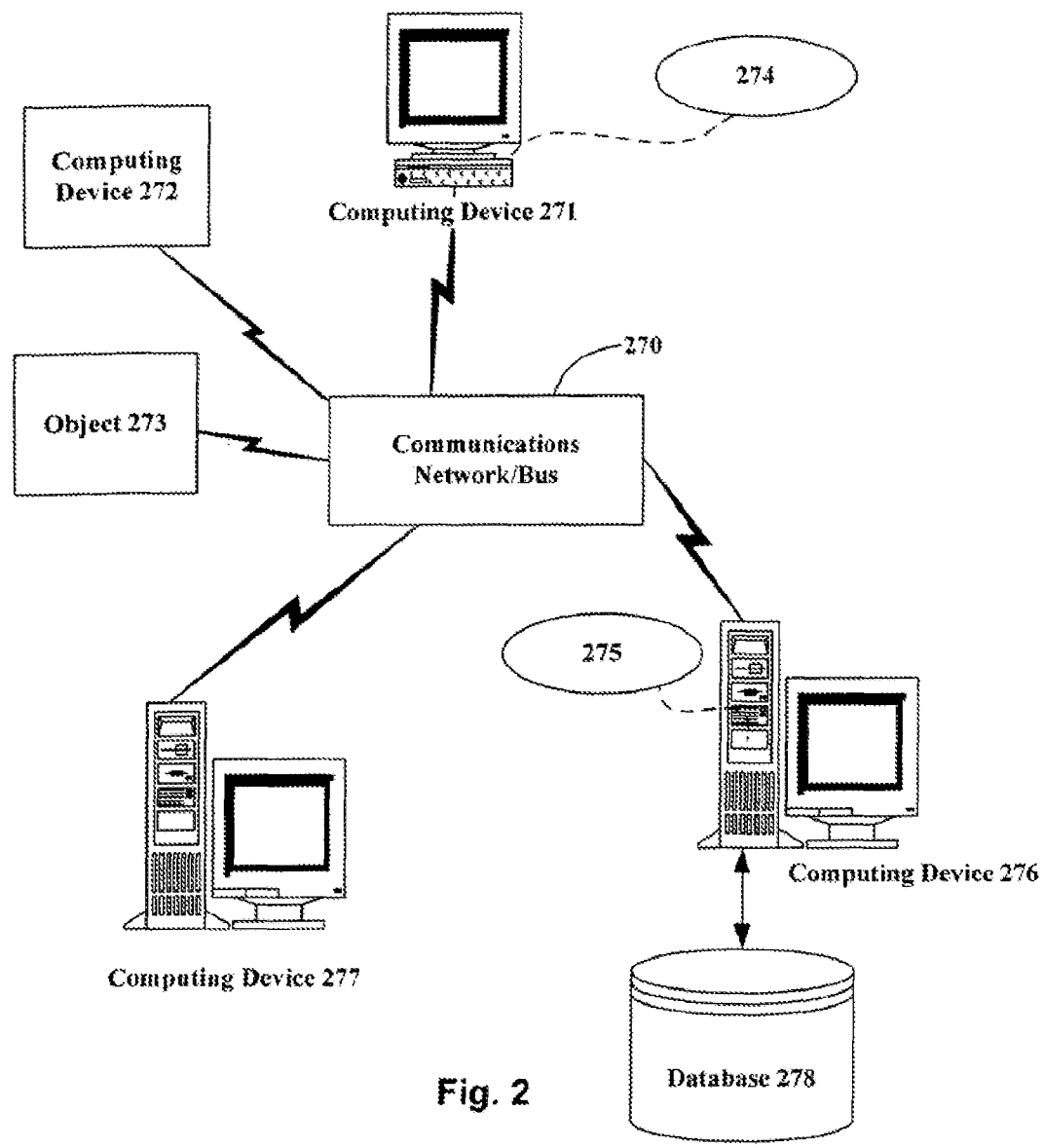
FIG. 2 illustrates an exemplary networked computing environment in which many computerized processes may be implemented to provide a competitive online quotes web service.

Referring next to FIG. 2, shown is an exemplary networked computing environment in which many computerized processes may be implemented to perform the processes described above. For example, parallel computing may be part of such a networked environment with various clients on the network of FIG. 2 using and/or implementing the processes for providing the subject matter of the present disclosure. One of ordinary skill in the art can appreciate that networks can connect any computer or other client or server device, or that computers may be connected in a distributed computing environment. In this regard, any computer system or environment having any number of processing, memory, or storage units, and any number of applications and processes occurring simultaneously, is considered suitable for use in connection with the systems and methods provided.

Distributed computing provides sharing of computer resources and services by exchange between computing devices and systems. These resources and services include the exchange of information, cache storage, and disk storage for files. Distributed computing takes advantage of network connectivity, allowing clients to leverage their collective power to benefit the entire enterprise. In this regard, a variety of devices may have applications, objects, or resources that may use the processes described herein.

FIG. 2 provides a schematic diagram of an exemplary networked or distributed computing environment. The environment comprises computing devices 271, 272, 276, and 277 as well as objects 273, 274, and 275, and database 278. Each of these computing devices 271, 272, 273, 274, 275, 276, 277 and 278 may comprise or make use of programs, methods, data stores, programmable logic, etc. The computing devices 271, 272, 273, 274, 275, 276, 277 and 278 may span portions of the same or different devices such as personal data assistants (PDAs), audio/video devices, MP3 players, personal computers, etc. Each computing device 271, 272, 273, 274, 275, 276, 277 and 278 can communicate with another computing device 271, 272, 273, 274, 275, 276, 277 and 278 by way of the communications network/bus 270. In this regard, any entity may be responsible for the maintenance and updating of a database 278 or other storage element.

The communications network 270 may itself comprise other computing entities that provide services to the system of FIG. 2, and may itself represents multiple interconnected networks. In accordance with an aspect of the subject matter, each computing device 271, 272, 273, 274, 275, 276, 277 and 278 may contain discrete functional program modules that might make use of an API, or other object, software, firmware and/or hardware, to request services of one or more of the other computing devices 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., or software objects such as interfaces, COM objects, and the like.

There are a variety of systems, components, and network configurations that support distributed computing environments. For example, computing systems may be connected by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, the computer systems communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 2 and the further diversification that can occur in computing in a network environment such as that of FIG. 2, the systems and methods provided herein cannot be construed as limited in any way to a particular computing architecture or operating system. Instead, the subject matter should not be limited to any single embodiment, but rather should be construed in breadth and scope in accordance with the appended claims.

Competitive Online Quotes System

Figure 3:
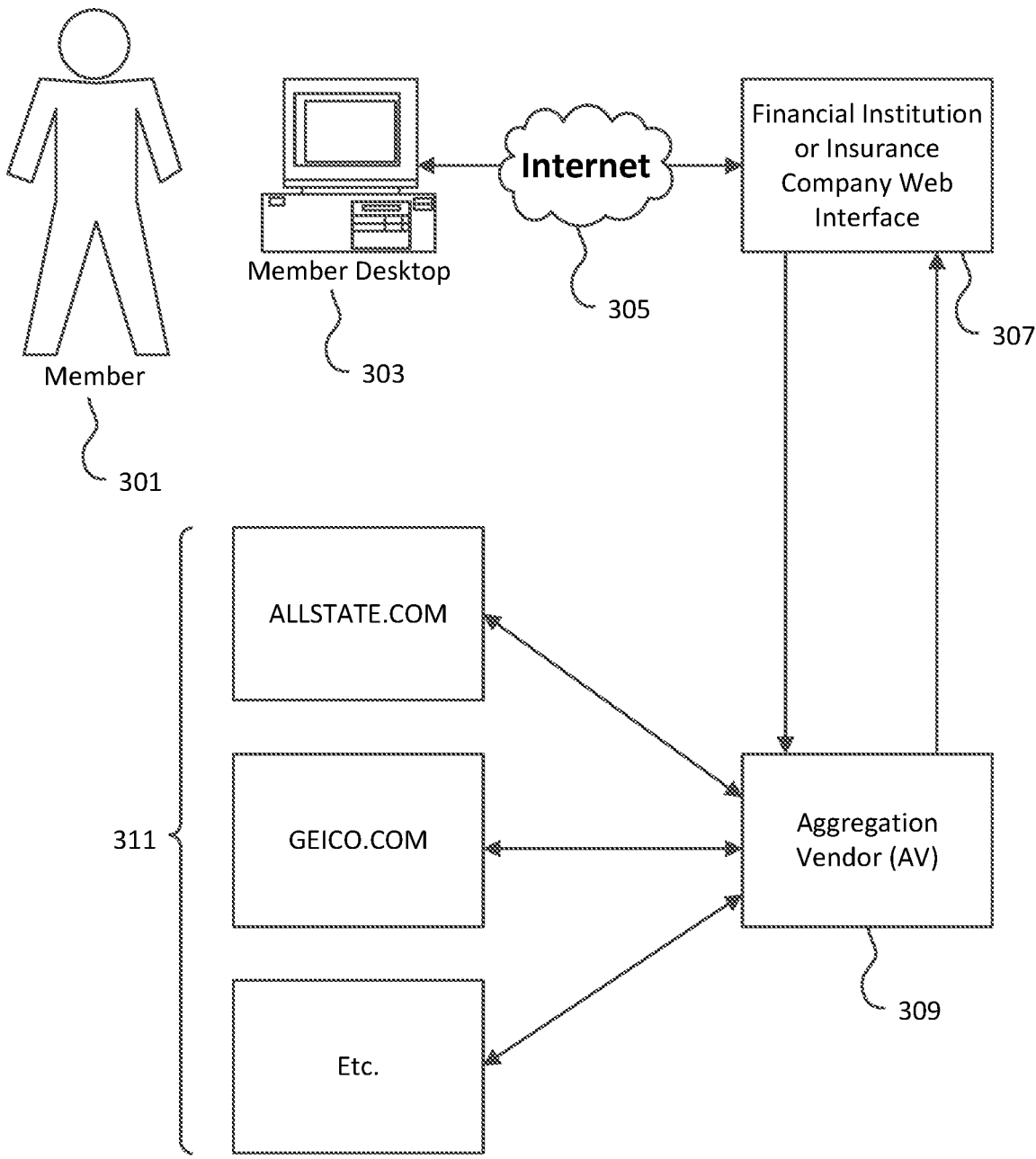
FIG. 3 is a diagram illustrating an example of a system for providing a competitive online quotes web service.

Referring next to FIG. 3, shown is a diagram illustrating an example of a system for providing a competitive online quotes web service. Member 301 of a financial or insurance institution has a member desktop 303 that has Internet access 305 to the financial or insurance institution's web site 307. The financial or insurance institution's Web interface is in communication over a computer network with one or more aggregation vendors (AVs) 309. Currently, many firms use these data extraction and integration (aggregator) services to provide competitive product premium pricing information for their main analysts and actuaries. The AV 309 is in communication with various other insurance and/or financial institutions. AVs 309 receive real-time competitive premium pricing updates as new information becomes available from the various other insurance and/or financial institutions.

Figure 4:
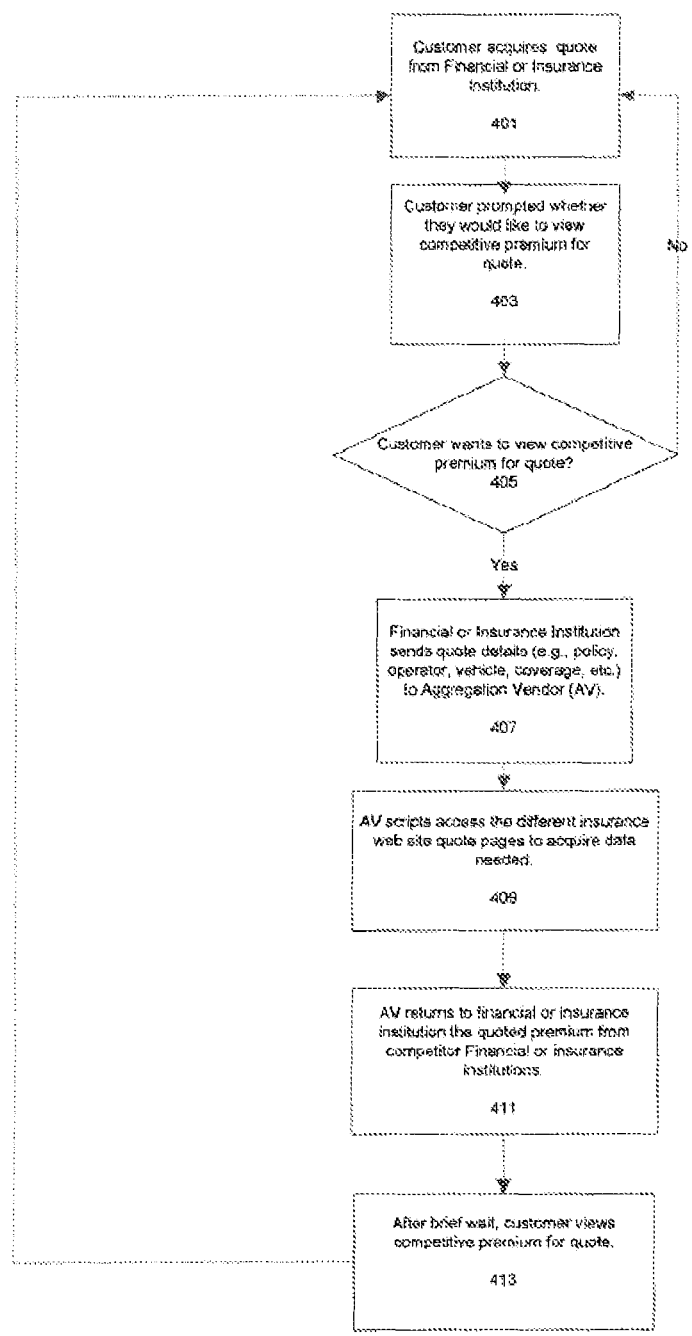
FIG. 4 is a flow chart diagram illustrating an example process for providing a competitive online quotes web service using the system of FIG. 3.

Referring next to FIG. 4, shown is a flow chart diagram illustrating an example process for providing a competitive online quotes web service to member 301 using the system of FIG. 3. Through the process shown in FIG. 4, a customer is able to view real-time competitive product pricing and analysis via the customer's personal computer and via the web. Part of the process dynamically uses data provided by the AVs 309 through their real-time competitive premium pricing updates to the web. First, a customer acquires 401 a quote from a financial or insurance institution. This may be a quote for auto, house or life insurance, a loan, or any other financial product or insurance policy.

Next, the customer may be prompted 403 (although not necessarily) whether they would like to view competitive premium and/or term information for the quote. This may include, for example, current premiums and/or terms being offered by other competitor insurance and financial institutions, etc. for the same or similar product. If the customer is prompted 403, it is then determined 405 whether the customer wants to view the competitive premiums for the quote based on the customer's response to the prompt.

If the customer does want to view the competitive premiums for the quote, the financial or insurance institution sends quote detail data (e.g., policy, operator, vehicle, coverage, etc.) to an AV. The AV's software scripts access the different insurance and/or financial institution web site quote pages to acquire 409 the data needed.

Figure 5:
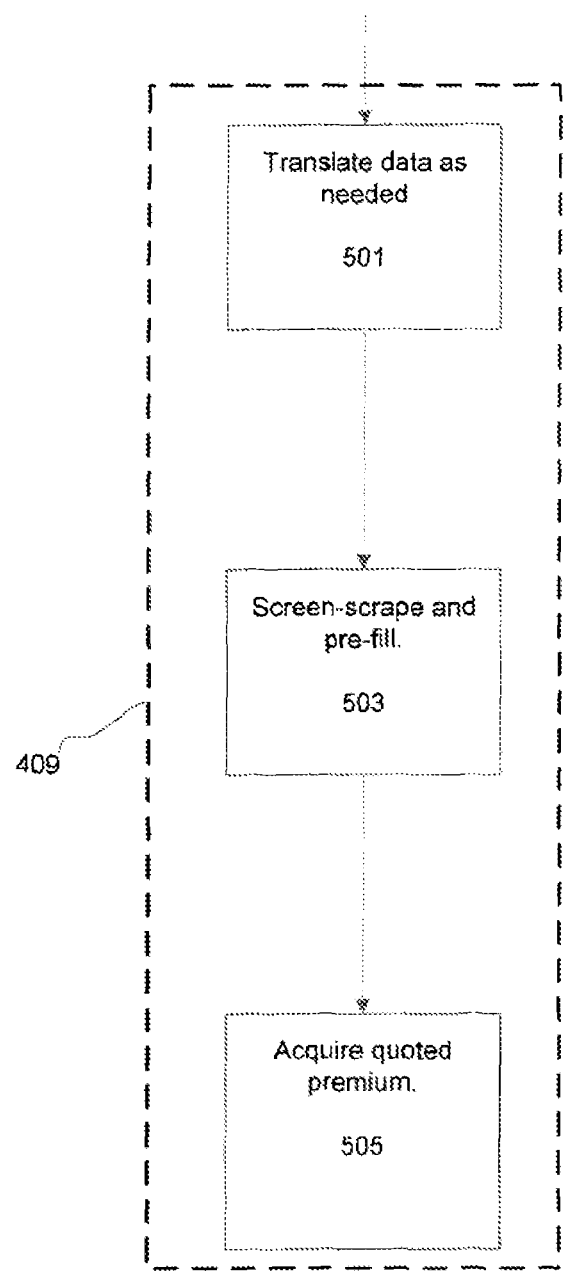
FIG. 5 is a flow chart diagram illustrating an example process for an aggregation vendor (AV) to acquire data needed to provide quote information within the process shown in FIG. 4.

Referring next to FIG. 5, shown is a flow chart diagram illustrating an example process for an AV to acquire 409 data needed to provide quote information within the process shown in FIG. 4. First, the quote detail data is translated as needed to be in a form suitable for processing by the AV. Next the AV may use techniques such as screen-scraping and pre-filling 503 at the various competitor web sites to provide and read the desired data at the competitors' web sites. Screen scraping is a technique in which a computer program extracts text data from the display output of another program, ignoring all binary data (usually images or multimedia data). The program doing the scraping is called a screen scraper. For example, the text data at the competitor web sites would be extracted or read using screen scraping, and fields requiring information to be entered would be filled with the appropriate data received from the customer (i.e., pre-filling).

There are also a number of synonyms for screen scraping, including: data scraping, data extraction, web scraping, page scraping, web page wrapping and HTML scraping (the last four being specific to scraping web pages). The corresponding quote is thus obtained 505 from the various competitors' web sites.

Referring back to FIG. 4, the AV then returns 411 to the financial or insurance institution the quoted premium from competitor financial or insurance institutions. This may be accomplished through any number of communication channels such as through the Web, Internet, email alerts, text messaging, etc. After perhaps a brief wait, the customer of the financial or insurance institution views 413, the competitive premium or terms for the quote at the financial or insurance institution's web interface 311.

Figure 6:
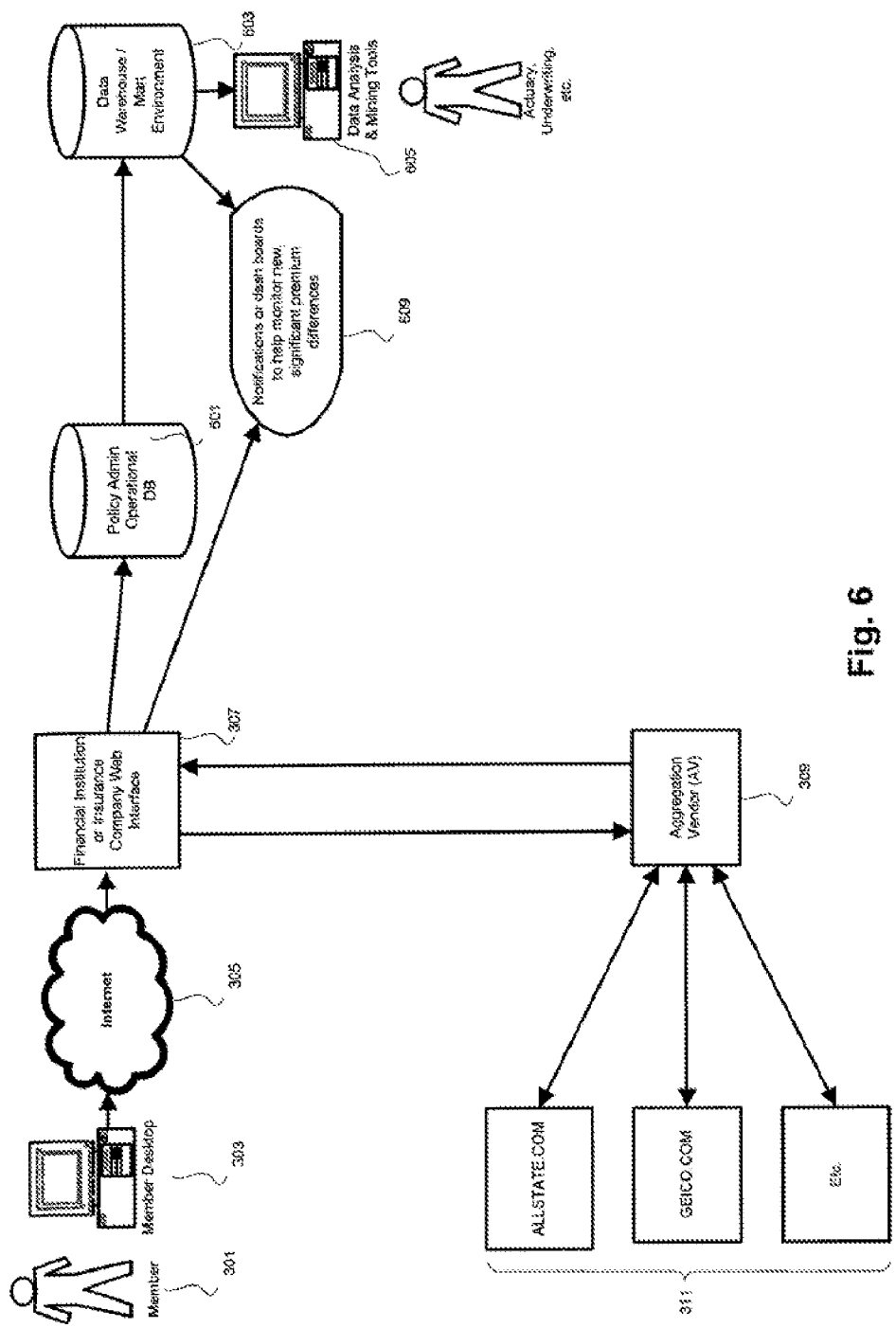
FIG. 6 is a diagram illustrating an example of a system for providing a competitive online quotes web service including subsequent analysis of competitor premiums.

Referring next to FIG. 6, shown is a diagram illustrating an example of a system for providing a competitive online quotes web service including subsequent analysis of competitor premiums. A member 301 of a financial or insurance institution has member desktop 303 that has Internet access 305 to the financial or insurance institution's web interface 307. The financial or insurance institution's web interface 307 is in communication over a computer network such as internet 305 with one or more aggregation vendors (AV(s)) 309. Currently, many firms use these data extraction and integration (aggregator) services to provide competitive product premium pricing information for their main analysts and actuaries. The AV(s) 309 is in communication with various other insurance and/or financial institutions 311. AVs 309 receive real-time competitive premium pricing updates as new information becomes available from the various other insurance and/or financial institutions.

A policy administration operational database 601 is in operative communication with the financial institution or insurance company web interface 307 and with the data warehouse/mart environment 603. A notifications and/or dashboard module 609 is in operative communication with the warehouse/mart environment 603 and financial institution or insurance company web interface 307. Data analysis and mining tools 605 are also in operative communication with the data warehouse/mart environment 603.

Figure 7:
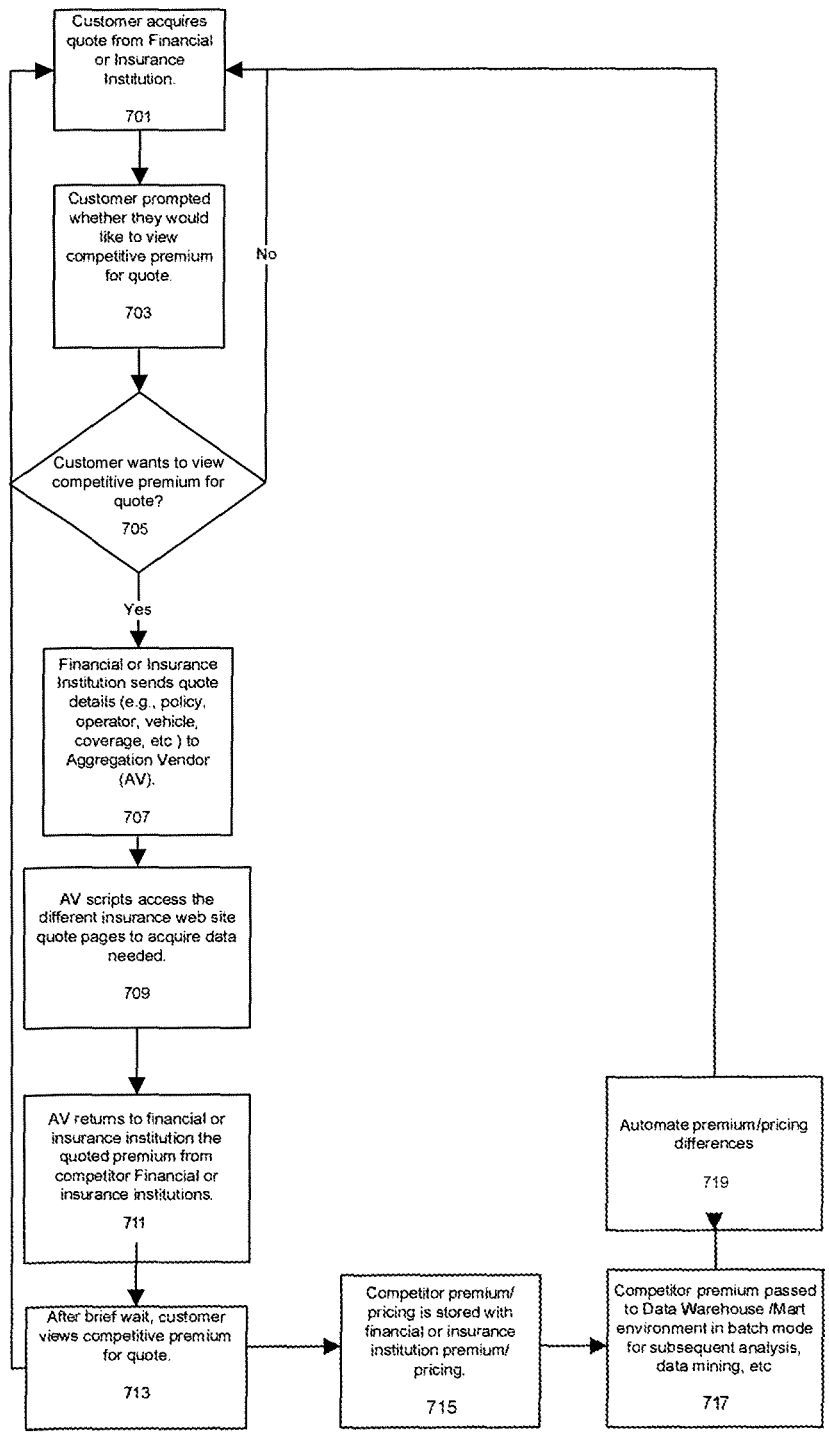
FIG. 7 is a flow chart diagram illustrating an example process for providing a competitive online quotes web service using the system of FIG. 6.

Referring next to FIG. 7, shown is a flow chart diagram illustrating an example process for providing a competitive online quotes web service using the system of FIG. 6. First, a customer acquires 701 a quote from a financial or insurance institution. This may be a quote for auto, house or life insurance, a loan, or any other financial product or insurance policy.

Next, the customer may be prompted 703 (although not necessarily) whether they would like to view competitive premium and/or term information for the quote. This may include, for example, current premiums and or terms being offered by other competitor insurance and financial institution, etc. for the same or similar product. If the customer is prompted 703, it is then determined 705 whether the customer wants to view the competitive premiums for the quote based on the customer's response to the prompt.

If the customer does want to view the competitive premiums for the quote, the financial or insurance institution sends quote detail data (e.g., policy, operator, vehicle, coverage, etc.) to an Aggregation Vendor (AV). The AV's software scripts access the different insurance and/or financial institution web site quote pages to acquire 709 the data needed to get the quoted premium from competitor financial or insurance institutions. The AV then returns 711 to the financial or insurance institution the quoted premium from competitor financial or insurance institutions. This may be accomplished through any number of communication channels such as through the Web, Internet, email alerts, text messaging, etc. After perhaps a brief wait, the customer of the financial or insurance institution views 413 the competitive premium or terms for the quote at their financial or insurance institution's web interface 307.

In addition, the competitive premium pricing information is then stored 715 with the financial or insurance institution's own premium pricing information. This is then stored in a data warehouse to provide real-time "dashboard" information for the financial or insurance institution to help monitor 717 new, significant premium differences with the financial or insurance institution's competitors. For example, the "dashboard" information is that which appears in real-time on a customer service representative's computer terminal during a conversation with the customer over the phone. Also, the new, significant premium differences with the financial or insurance institution's competitors is used to automate 719 premium price changes in real-time or near real-time to help ensure the financial or insurance institution's competitiveness.

Member Data Aggregation

Although commonly understood to be a normal business occurrence in many industries, companies attempt to minimize the collection of prices and/or quotes by their competitors. With an increasing number of surveillance and detection techniques becoming available at increasingly lower costs, data aggregation is becoming increasingly difficult. For example, although the presentment of quotes to a potential customer may be real time, the data upon which the quotes are generated may be dated by perhaps a day or more. The reason for this is companies typically monitor for certain IP addresses known to be associated with either competitors or data aggregation companies. If a known, undesired IP address attempts to access their website, companies will typically not permit access to a competitive quote. Additionally, if companies know that certain IP addresses are associated with competitors or data aggregators, the companies may return erroneous and misleading quotes in an attempt to wrongly influence the behavior of their competitors. Thus, with increasing monitoring capabilities, it may be difficult to obtain competitive quote information.

Figure 8:
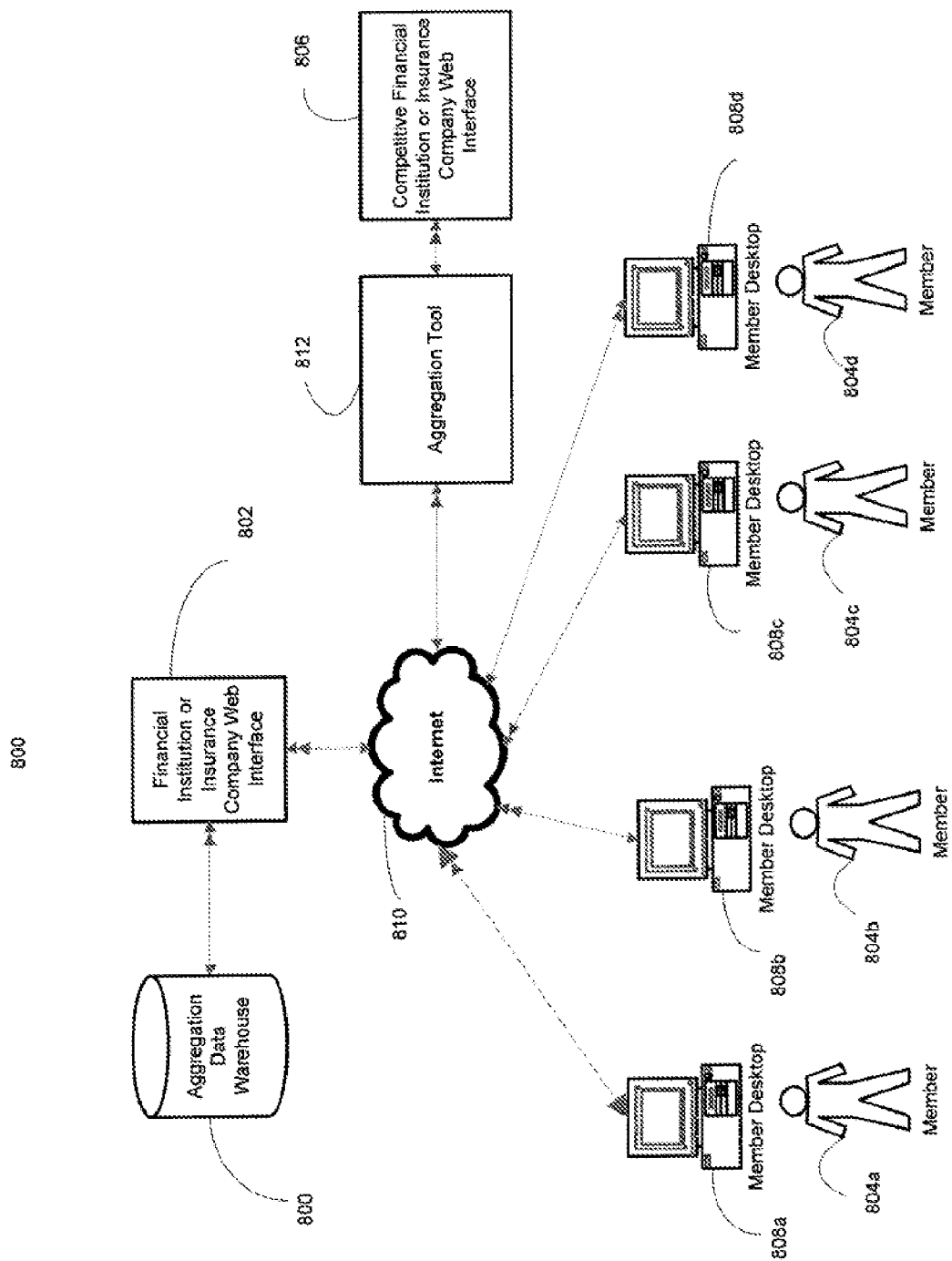
FIG. 8 is an illustration of an exemplary and non-limiting system for obtaining competitive quote information.

FIG. 8 is an illustration of a system to obtain competitive quote information that attempts to bypass the filters and barriers erected by competitors to block quote data aggregation by using a potential customer's IP address as the origination point of competitive quote requests. The customer's computer is configured to save the information and to send the information to the member's company. In FIG. 8, members 804*a-d* have requested institution 802 to provide them with competitive quotes for a prospective business relationship.

Institution 802 downloads, via a network such as the internet 810, data aggregation tool 812 onto the members 804*a-d* computers 808*a-d*, respectively, and upon request. Data aggregation tool 812 may be a java applet loaded onto customers' computers 808*a-d* upon initiation of a request, and the applet automatically removed when the request and data aggregation is complete. Once downloaded and configured to operate on the respective customers' computers 808*a-d*, data aggregation tool 812 interacts with the competitor's interface 806 to input the customer information provided by the customer and retrieve the quotes. Data aggregation tool 812 then causes the quote to be transmitted to institution 802, upon which the institution 802 provides the customer with a competitive quote.

To maintain a database of quotes, institution 802 may also store the quote in warehouse 800. The data contained in warehouse 800 may be used for several purposes, including data mining as discussed above, as well as to provide quotes to customers when an applet or some form of a data aggregation tool, such as data aggregation tool 812, is not available for use. Institution 802 may then determine a quote based upon the inputted customer information and the information already contained within warehouse 800. Additionally, storing information in warehouse 800 may also allow for additional information determination. For example, trends occurring in the industry may be realized through comparisons of similar customer information, thus allowing institution 802 to remain competitive.

Although there may be several ways in which to facilitate the data collection, a java applet downloaded to customers' computers 808*a-d* provides for automatic information upload to competitor's interface 806. Depending upon the configuration, the java applet may be permanent, thus allowing the customer to monitor for competitive quotes without the need to send a request to institution 802. The manner in which a data aggregation tool, such as data aggregation tool 812, interacts with the member may vary, but in one exemplary and non-limiting embodiment a java applet is automatically downloaded to a member's computer upon receipt of a request for a quote.

Figure 9:
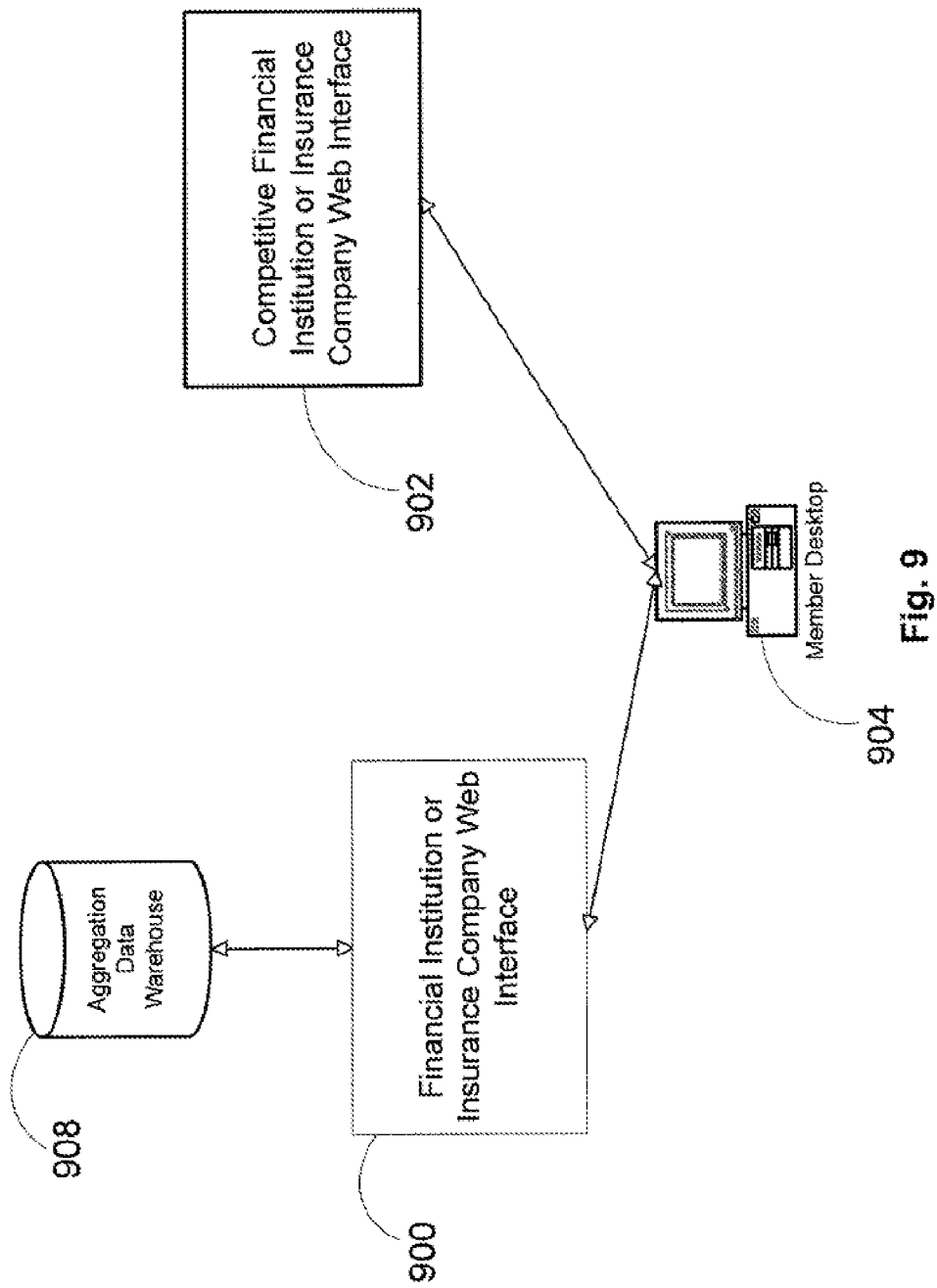
FIG. 9 is illustrative of an exemplary and non-limiting communication flow path using the system of FIG. 8.

FIG. 9 is illustrative of a communication flow path using the system of FIG. 8. Member desktop 904 interfaces with institution 900, the institution in which the member is shopping at, and competitive institution 902, the institution in which the member is receiving competitive quotes from. Computer 904 is the computer from which the request is transmitted to institution 902 rather than institution 900. Institution 902 receives the request originating from the IP address of computer 904. Thus, even if detection systems were in place to detect behavior or attempts at access by competitors, it may be difficult to determine if computer 904 is a typical potential customer requesting a quote or is a computer configured and operating in a manner similar to computer 904.

Figure 10:
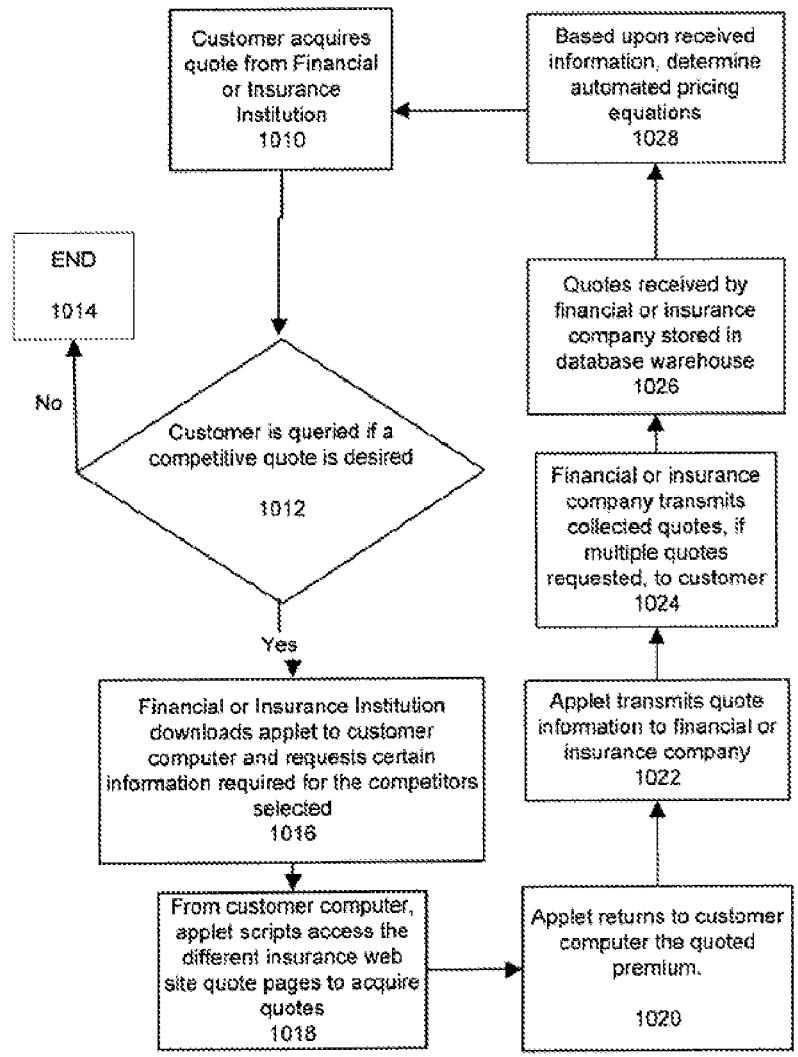
FIG. 10 illustrates an exemplary and non-limiting method of aggregating data using a customer's computer to provide aggregation data.

FIG. 10 illustrates an exemplary and non-limiting method of aggregating data using a customer's computer to provide aggregation data. The customer will first, at block 1010, acquire a quote from a financial or insurance company website when shopping around. In today's marketplace, this request is increasingly done through the Internet in an automated fashion, though a customer service representative may also assist the customer. The customer is then 1012 queried to see if they would like to receive quotes from the company's closest competitors. If the customer does not wish to view quotes, the customer receives the quote from the company and the process ends 1014. If the customer does wish to view competitive quotes 1012, the financial institution will cause an applet to be downloaded 1016 to the customer's computer. The applet will automatically load and execute on the customer's computer. The customer puts in required personal information, sometimes particular to each of the competitor's Internet sites. The information necessary for a quote may be gained either through direct intelligence collection efforts, e.g. the company itself looks at the competitor's website, or from prior attempts by customers at accessing and receiving quotes.

Once the customer enters in their information, the applet scripts access 1018 the selected competitors' websites, the selection done either by the customer or by the financial institution. The applet script automatically inputs the inputted personal information into each of the selected competitors' websites and receives 1020, quote information. At this point, the quote information may be presented to the customer or may be transmitted 1022 to the financial or insurance company for later presentment. Although a customer may want quotes presented to them as they are received, if all quotes are presented to the customer in an easily-read format, such as a table that puts relevant information side-by-side for comparison purposes, the customer may be able to better compare the received quotes. If the quote presentments are withheld until all or an acceptable portion of quotes are received, the financial or insurance company may then format the quotes and transmit 1024 all quotes received back to the customer for comparison.

The quotes received and the personal information inputted to obtain the quotes are then stored 1026 in a data warehouse for future use. For example, if a prospective customer does not have access to a computer, or does not want to submit their personal information to competitive sites, the financial or insurance company may determine 1028 competitive quotes based upon correlations determined from quote information received by other customers. Therefore, if attempts to directly access competitor online quoting systems fail, or the customer is not able or willing to provide the requisite information to the competitor's sites, the customer can still receive relevant online quotes.

Monitoring Competitor Behavior

Another benefit may be achieved through customer-based data aggregation. Because data aggregators typically operate using a batch process, whereby the data collection is performed in a single process at a pre-determined time, the information collected may be outdated. Additionally, competitors may want to monitor other competitors' sites for changes in behavior or information present. For example, an insurance company may change desired personal information due to a change in internal requirements of the company. This change in information may signal any number of possible occurrences within the company, but if the information requested to provide a quote is not in line with the rest of the industry, the change may reflect some internal issues or marketing efforts the competitor is undergoing.

Figure 11:
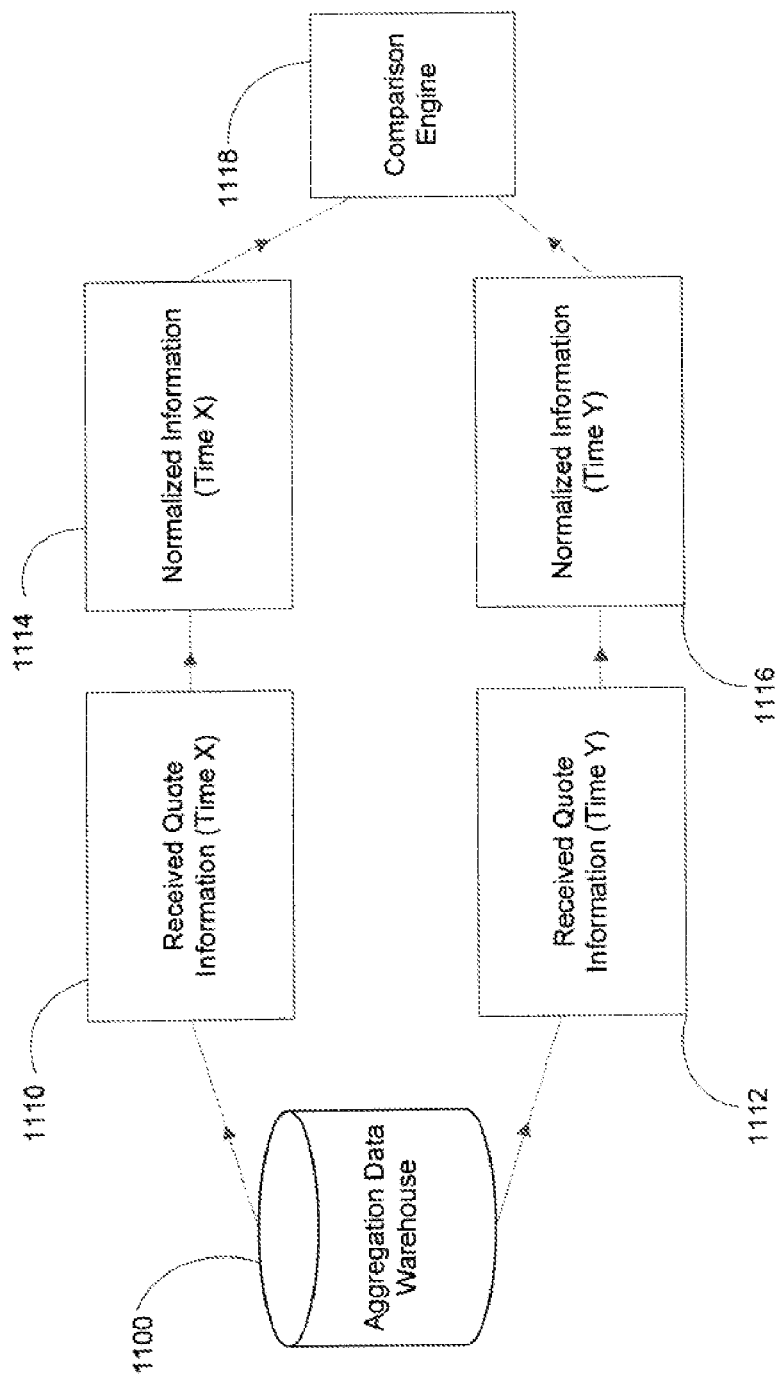
FIG. 11 is an exemplary and non-limiting illustration of a system that a company can use to monitor for changes to a competitor's quoting system.

FIG. 11 is an exemplary and non-limiting illustration of a system that a company can use to monitor for changes to a competitor's quoting system. Through various sources, either from customers' computers or through data aggregation sources, such as those discussed above, aggregation data warehouse 1100 has information relating to received quotes from customers. The quotes are time stamped by the time the quotes were received. The time stamp provides for a determination of change over time, one manner in which to compare quote changes. Another way to compare quotes is to determine the difference between the quote received using certain inputted information and another quote using slightly dissimilar inputted information. For example, two quotes may be received with similar inputted personal information. If one quote is significantly different than the other, this may indicate preferences the competitor may have towards the dissimilarly inputted information.

Aggregation data warehouse 1100 stores quote information. The quotes are compared over a time period, from period (X) to period (Y). Received quote at time (X) 1110 is reconfigured to be normalized data at time X 1114. The normalization of data may remove extraneous or clearly erroneous data for purposes of comparison. Received quote at time (Y) 1112 is reconfigured to be normalized data at time Y 1116. Comparison engine 1118 compares normalized information 1114 and 1116 to determine, among other data, change of quotes over time.

The methods and apparatus of the present subject matter may also be embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, a video recorder or the like, the machine becomes an apparatus for practicing the subject matter. When implemented on a general-purpose processor, the program code combines with the processor to provide a unique apparatus that operates to perform the functionality of the present subject matter.

While the present subject matter has been described in connection with the preferred embodiments of the various figures, it is to be understood that other similar embodiments may be used, or modifications and additions may be made to the described embodiment, for performing the same function of the present subject matter without deviating there from. Furthermore, it should be emphasized that a variety of computer platforms, including handheld device operating systems and other application-specific hardware/software interface systems, are herein contemplated, especially as the number of wireless networked devices continues to proliferate. Therefore, the present subject matter should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present subject matter should not be limited to specific embodiments described herein but instead construed most broadly.

What is claimed is:

1. A method comprising:
    providing, by a data aggregation tool on a customer computer, data associated with a request for financial product pricing information, wherein the data aggregation tool is configured to communicate with an aggregation vendor;
    in response to the request:
        receiving, by the aggregation vendor, first company financial product pricing information, wherein the first company financial product pricing information is generated by a processor-based system associated with a first company;
        accessing, by the aggregation vendor, a web page of a second company;
        pre-filling, by the aggregation vendor, the data associated with the request to the web page of the second company;
        submitting, by the aggregation vendor, the data associated with the request to the web page of the second company; and
        scraping, by the aggregation vendor, the web page of the second company to extract the financial product pricing information of the second company after the web page of the second company returns the financial product pricing information; and
    providing, from the aggregation vendor to the customer computer via the data aggregation tool, the financial product pricing information from the second company and the first company financial product pricing information.

2. The method of claim 1, further comprising providing data associated with the financial product pricing information to the aggregation vendor.

3. The method of claim 2, further comprising sending, by the customer computer, the financial product pricing information received at the aggregation vendor to the second company.

4. The method of claim 1, wherein the data aggregation tool is implemented as an applet.

5. The method of claim 4, further comprising downloading, by the customer computer, the applet before receiving data.

6. The method of claim 4, further comprising automatically deleting the applet after providing the financial product pricing information and the first company financial product pricing information.

7. The method of claim 1, further comprising:
    providing, by the customer computer via the data aggregation tool, an interface to receive the data associated with the request for financial product pricing information.

8. A system comprising:
    a customer computer comprising one or more processors and non-transitory memory storing computer executable instructions that, when executed by the one or more processors, cause the customer computer to:
    provide, via a data aggregation tool on a customer computer, data associated with a request for financial product pricing information, wherein the data aggregation tool is configured to communicate with an aggregation vendor;
    in response to the request:
        receive first company financial product pricing information;
        access by the aggregation vendor a server of a second company;
        pre-fill by the aggregation vendor the data associated with the request to the web page of the second company;
        submit by the aggregation vendor the data associated with the request to the web page of the second company; and
        scrape by the aggregation vendor the web page of the second company to extract the financial product pricing information of the second company using the data aggregation tool after the web page of the second company returns the financial product pricing information; and
    provide the financial product pricing information from the second company and the first company financial product pricing information.

9. The system of claim 8, further comprising at least one subsystem configured to provide data associated with the financial product pricing information to an aggregation vendor.

10. The system of claim 9, further comprising at least one subsystem configured to send the financial product pricing information received at the aggregation vendor to the second company.

11. The system of claim 8, wherein the data aggregation tool is implemented as an applet.

12. The system of claim 11, wherein the customer computer is configured to download the applet before receiving data.

13. The system of claim 11, wherein the customer computer is configured to delete the applet after providing the financial product pricing information and the first company financial product pricing information.

14. The system of claim 11, wherein the data aggregation tool on the customer computer is configured to provide an interface to receive the data associated with the request for financial product pricing information.

15. A non-transitory computer-readable medium storing computer-readable instructions that, when executed, cause:
   providing, via a data aggregation tool on a customer computer, data associated with a request for financial product pricing information, wherein the data aggregation tool is configured to communicate with an aggregation vendor;
   receiving first company financial product pricing information;
   accessing, using the aggregation vendor, a web page of a second company;
   pre-filling, using the aggregation vendor, data associated with the request to the web page of the second company;
   submitting, using the aggregation vendor, the data associated with the request;
   scraping, using the aggregation vendor, the web page of the second company to extract the financial product pricing information of the second company using the data aggregation tool after the web page of the second company returns the financial product pricing information; and
   providing, from the aggregation vendor to the customer computer via the aggregation tool, the financial product pricing information from the second company and the first company financial product pricing information.

16. The non-transitory computer-readable medium of claim 15, wherein the instructions that, when executed, further cause providing data associated with the financial product pricing information to the aggregation vendor.

17. The non-transitory computer-readable medium of claim 16, wherein the instructions, when executed, further cause sending the financial product pricing information received at the aggregation vendor to the second company.

18. The non-transitory computer-readable medium of claim 15, wherein the data aggregation tool is implemented as an applet.

19. The non-transitory computer-readable medium of claim 18, wherein the instructions that, when executed, further cause downloading the applet before receiving data.

20. The non-transitory computer-readable medium of claim 18, wherein the instructions that, when executed, further cause deleting the applet after providing the financial product pricing information and the first company financial product pricing information.

* * * * *